(12) United States Patent
Bratkovski et al.

(10) Patent No.: US 8,109,142 B2
(45) Date of Patent: Feb. 7, 2012

(54) INERTIAL SENSING SYSTEM WITH A CURVED BASE AND A DIAMAGNETIC MASS

(75) Inventors: Alexandre M. Bratkovski, Mountain View, CA (US); Iakov V. Kopelevitch, So Paulo (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 364 days.

(21) Appl. No.: 12/433,661

(22) Filed: Apr. 30, 2009

(65) Prior Publication Data

US 2010/0275686 A1 Nov. 4, 2010

(51) Int. Cl.
*G01M 1/12* (2006.01)
(52) U.S. Cl. .................... 73/382 R; 73/382 G
(58) Field of Classification Search ............. 73/382 G, 73/382 R
See application file for complete search history.

(56) References Cited

U.S. PATENT DOCUMENTS

| | | | | |
|---|---|---|---|---|
| 3,954,064 A | * | 5/1976 | Minovitch | 104/138.1 |
| 4,355,541 A | | 10/1982 | Okubo | |
| 5,007,292 A | * | 4/1991 | Crowe et al. | 73/654 |
| 6,679,118 B1 | * | 1/2004 | Esashi et al. | 73/514.32 |
| 7,252,001 B2 | * | 8/2007 | Boletis et al. | 73/514.17 |
| 2005/0265508 A1 | | 12/2005 | Kessler | |
| 2006/0162452 A1 | | 7/2006 | Moser et al. | |
| 2008/0271550 A1 | | 11/2008 | Muessli | |
| 2009/0058580 A1 | | 3/2009 | Dunkelberger | |

OTHER PUBLICATIONS

Simon, M.D. et al., Diamagnetic levitation: Flying frogs and floating magnets (invited), Journal of Applied Physics, May 1, 2000, p. 6200-6204.
Simon, M.D. et al., "Diamagnetically stabilized magnet levitation", American Association of Physics Teachers, Jun. 2001, p. 702-713.
Kamins, T.I. et al., "Metal-catalysed, bridging nanowires as vapour sensors and concept for their use in a sensor system", IOP Publishing Ltd, May 2006.

* cited by examiner

*Primary Examiner* — Max Noori

(57) ABSTRACT

An inertial sensing system includes a diamagnetic mass, a plurality of permanent magnets positioned to form a curved base, wherein the plurality of permanent magnets are configured to provide an inhomogeneous magnetic field upon which the diamagnetic mass becomes levitated above the plurality of permanent magnets within the curved base and wherein the curved base also provides a confinement potential to substantially prevent the diamagnetic mass from exiting an interior of the curved base, and a tracking apparatus for monitoring at least one of a position and an orientation of the diamagnetic mass with respect to the curved structure.

17 Claims, 5 Drawing Sheets

400 ⤹

```
┌─────────────────────────────────┐
│ POSITION DIAMAGNETIC MASS WITHIN│
│         CURVED BASE             │
│             402                 │
└─────────────────────────────────┘
              │
              ▼
┌─────────────────────────────────┐
│ MONITOR POSITION OF DIAMAGNETIC │
│             MASS                │
│             404                 │
└─────────────────────────────────┘
              │
              ▼
┌─────────────────────────────────┐
│ DETERMINE RELATIVE DISPLACEMENT │
│      OF THE DIAMAGNETIC MASS    │
│             406                 │
└─────────────────────────────────┘
```

```
┌─────────────────────────────────┐
│ POSITION DIAMAGNETIC MASS WITHIN│
│         CURVED BASE             │
│             502                 │
└─────────────────────────────────┘
              │
              ▼
┌─────────────────────────────────┐
│  CAUSE DIAMAGNETIC MASS TO      │
│           ROTATE                │
│             504                 │
└─────────────────────────────────┘
              │
              ▼
┌─────────────────────────────────┐
│ MONITOR POSITION/ORIENTATION OF │
│      THE DIAMAGNETIC MASS       │
│             506                 │
└─────────────────────────────────┘
              │
              ▼
┌─────────────────────────────────┐
│ DETERMINE POSITION/ORIENTATION  │
│      OF THE DIAMAGNETIC MASS    │
│             508                 │
└─────────────────────────────────┘
```

*FIG. 5*

INERTIAL SENSING SYSTEM WITH A CURVED BASE AND A DIAMAGNETIC MASS

BACKGROUND

Inertial sensing systems operate through detection of relative displacement between an inertial mass and a base, when the base is subjected to an external force, such as, a perturbation or a vibration. A particular type of inertial sensing system is a gyroscope, which is composed of an inertial mass that is rotated about an axis of inertia and is operated by detecting relative movement between the axis of inertia and a base of the instrument supporting the gyroscope or the force generated by the axis of inertia on the base when the instrument is subjected to an external force, such as, a perturbation or a vibration.

Precise inertial sensing systems are desirable in a number of various applications, such as, navigation and geophysical studies, as well as fundamental issues, such as, testing of general laws of gravity. Inertial sensing systems are, however, often limited due to friction between the inertial mass and the base. In addition, mechanical drift limits precision of mechanical gyroscopes to no better than $10^{-3}\Omega_E$, in which $\Omega_E$ is the angular velocity of earth.

One way to alleviate some of these problems is through the use of diamagnetic levitation, which uses passive levitation at room temperature. More particularly, diamagnetic materials are known to be repelled by magnetic fields created by permanent magnets and are stably levitated above the permanent magnets.

BRIEF DESCRIPTION OF THE DRAWINGS

Embodiments are illustrated by way of example and not limited in the following figure(s), in which like numerals indicate like elements, in which:

FIG. 4 illustrates a flow diagram of a method of implementing the inertial sensing systems depicted in FIGS. 1A-1C, 2, and 3B, according to an embodiment of the invention; and FIG. 5 illustrates a flow diagram of a method of implementing the inertial sensing system depicted in FIG. 3B, according to an embodiment of the invention.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures are not described in detail so as not to unnecessarily obscure the description of the embodiments.

Disclosed herein is an inertial sensing system that includes a plurality of permanent magnets positioned to form a curved base, a diamagnetic mass and a tracking apparatus. The permanent magnets forming the curved base produces a magnetic field upon which the diamagnetic mass levitates. Because the diamagnetic mass is levitated above the magnets, the diamagnetic mass may be made to rotate with respect to the permanent magnets, with relatively little friction. In addition, the diamagnetic mass is configured to become relatively displaced with respect to the permanent magnets when the curved base formed of the permanent magnets is perturbed. In addition, the tracking apparatus is configured to detect the relative displacement of the diamagnetic mass with respect to the curved base.

According to an embodiment, the inertial sensing system disclosed herein is implemented as an accelerometer. In this embodiment, the tracking apparatus tracks the relative displacement of the diamagnetic mass with respect to the curved base to determine acceleration. According to a particular embodiment, the inertial sensing system disclosed herein may be employed to detect frequencies of vibrations and may thus be employed as a microphone.

According to another embodiment, the inertial sensing system disclosed herein is implemented as a gyroscope. In this embodiment, a driver system may operate to cause the diamagnetic mass to spin at a relatively high spin rate. In addition, the tracking apparatus may be utilized in order to measure either or both of the relative displacement and the orientation of the diamagnetic mass with respect to the curved base.

Figure 1A:
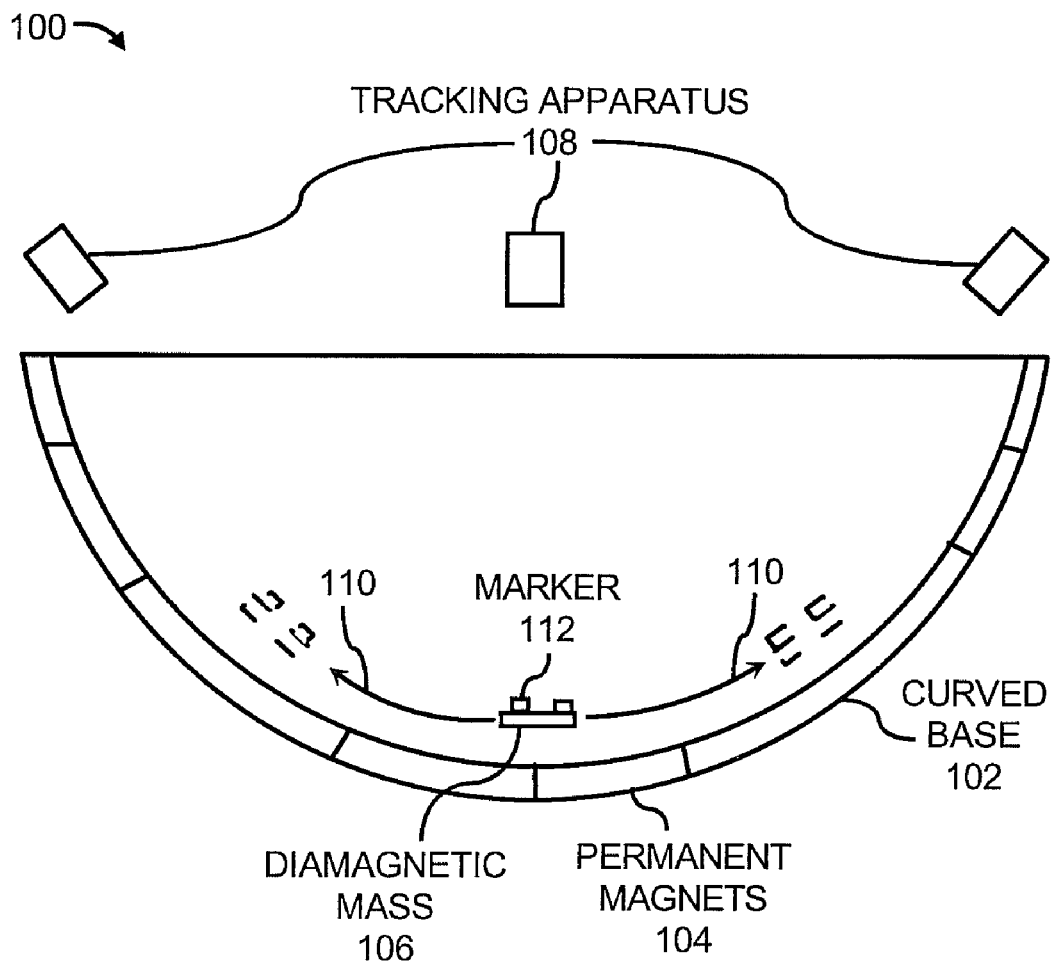
FIG. 1A illustrates a cross-sectional view of an inertial sensing system, according to an embodiment of the invention.

With reference first to FIG. 1A, there is shown a cross-sectional side view of an inertial sensing system 100, according to an embodiment. It should be understood that the inertial sensing system 100 depicted in FIG. 1A may include additional components and that some of the components described herein may be removed and/or modified without departing from a scope of the inertial sensing system 100.

Figure 1B:
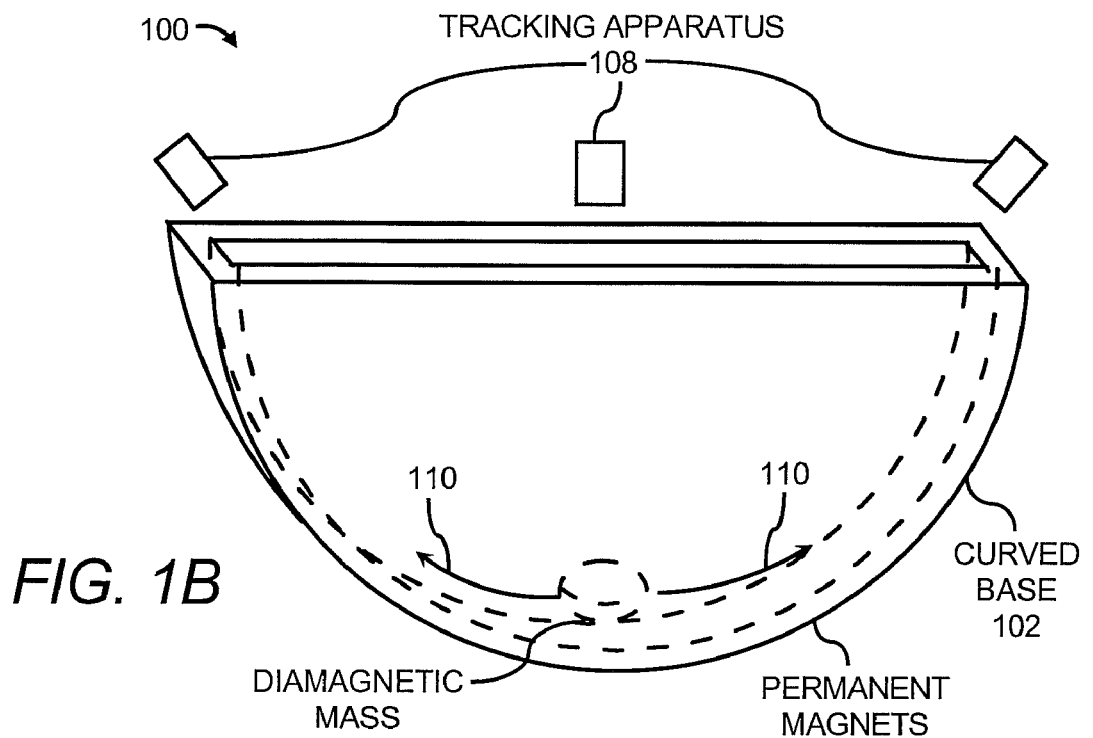
FIGS. 1B and 1C, respectively, illustrate perspective views of the inertial sensing system depicted in FIG. 1A, according to embodiments of the invention.
Figure 1C:
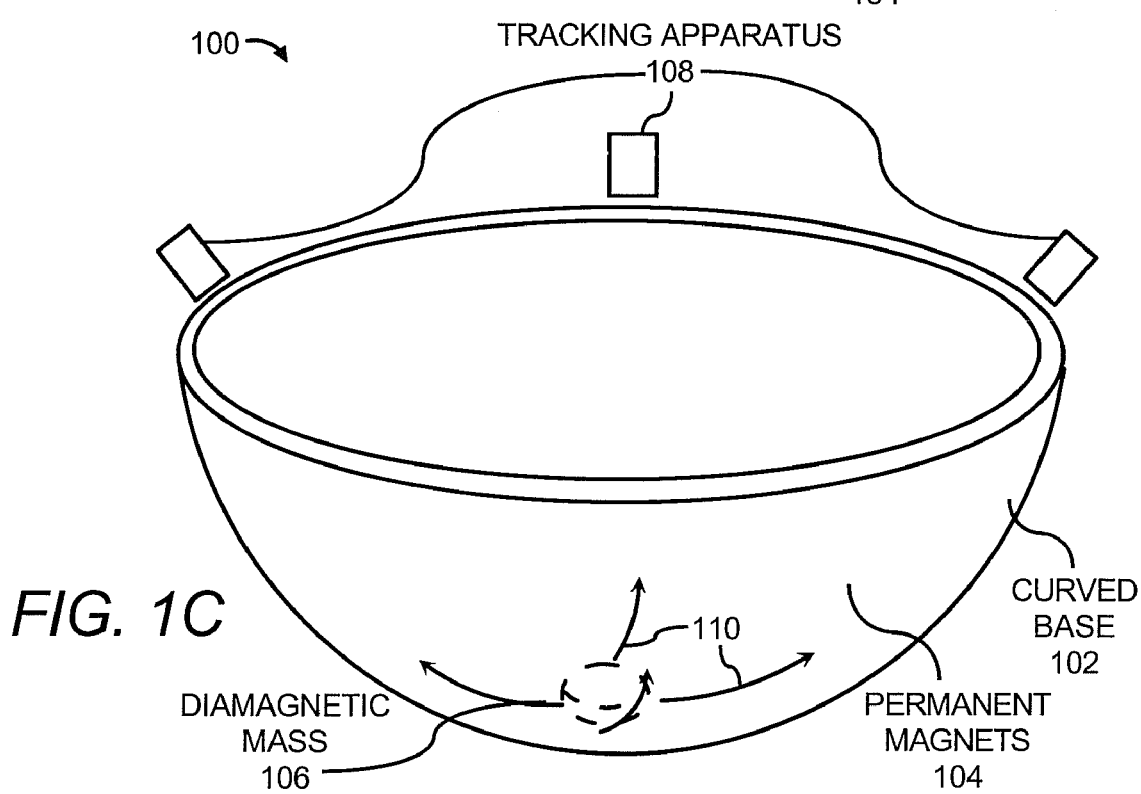

As depicted in FIG. 1A, the inertial sensing system 100 includes a curved base 102, a diamagnetic mass 106, and a tracking apparatus 108. The curved base 102 is comprised of a plurality of permanent magnets 104. According to an embodiment, the curved base 102 is formed with the permanent magnets 104 to form a space that substantially restricts movement of the diamagnetic mass 106 to be confined to two dimensions. An example of this arrangement is shown in FIG. 1B, which shows that the diamagnetic mass 106 is constricted to movements depicted by the arrows 110. According to another embodiment, the curved base 102 is formed with the permanent magnets 104 to form a space that enables the diamagnetic mass 106 to move in three dimensions. An example of this arrangement is shown in FIG. 1C, which shows that the diamagnetic mass 106 is able to move in three dimensions as depicted by the arrows 110.

Figure 2:
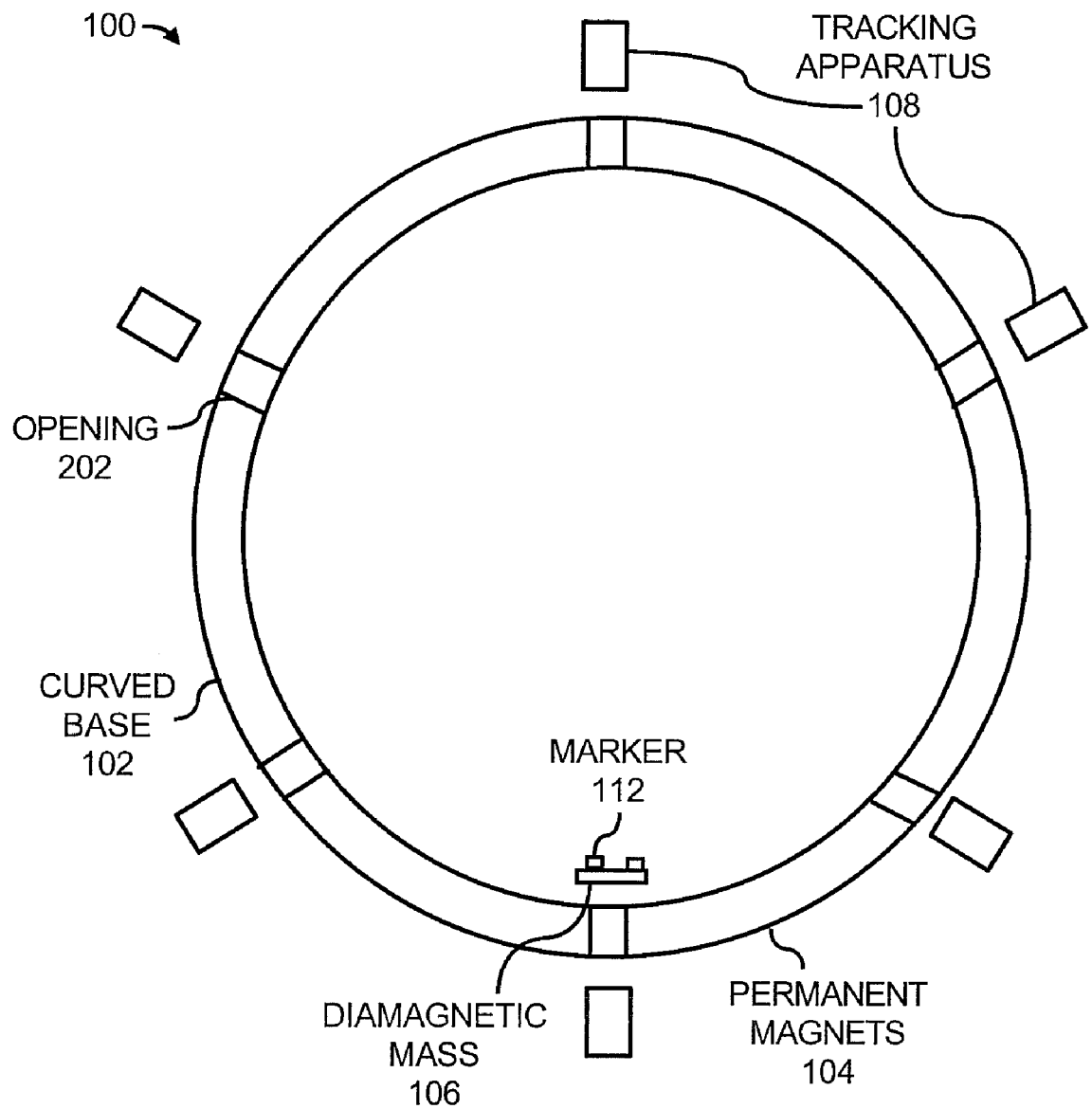
FIG. 2 illustrates a cross-sectional side view of an inertial sensing system, according to a further embodiment of the invention.

According to a further embodiment, the curved base 102 comprises a spherical configuration as shown in FIG. 2. More particularly, for instance, the inertial sensing system 100 depicted in FIG. 2 may be shaped in either of the manners depicted in FIGS. 1B and 1C. In this regard, the diamagnetic mass 106 may be configured to move in two or three dimensions around the spherical configuration depicted in FIG. 2. Although not particularly shown, each of the curved bases 102 depicted in FIGS. 1A-1C and 2 include a plurality of permanent magnets 104.

In each of the embodiments above, the permanent magnets 104 are connected to each other, for instance, through magnetic forces, through use of adhesives (applied to the base and to each other), mechanical fasteners, etc., to form the curved base 102. According to another example, a curved shell (not shown) is paved with the permanent magnets 104 to form the curved base 102.

The permanent magnets 104 arranged in the curved base 102 configuration generally provide a confinement potential in which the diamagnetic mass 106 is suspended. In other words, the walls of the curved base 102 are configured to provide magnetic fields to substantially prevent the diamagnetic mass 106 from exiting the interior of the curved base 102 when the curved base 102 is perturbed. As discussed above, the arrows 110 generally denote approximate directions that the diamagnetic mass 106 may move when the curved base 102 is perturbed.

The permanent magnets 104 arranged in the curved base 102 produce a magnetic field upon which the diamagnetic mass 106 levitates. According to an embodiment, the permanent magnets 104 are arranged to produce an inhomogeneous magnetic field across the curved base 102. The permanent magnets 104 may be arranged in any of a number of configurations to produce the magnetic field. The permanent magnets 104 tend to produce a zero net field near the base with alternating patches of up- and down-directed normal components of the magnetic field B(z), and nodal lines of zero vertical field. The alternating patches of up- and down-directed normal components of the magnetic field B(z) may be characterized as non-zero field gradient, having a gradient $B^2 \neq 0$. Further, the alternating patches of up- and down-directed normal components of the magnetic field produce the same buoyancy force per unit area, see Equation (1) below. In addition, the permanent magnets 104 may comprise any suitable material capable of generating sufficient magnetic fields to levitate the diamagnetic mass 106, such as, bornite ($Cu_5FeS_4$), samarium cobalt ($SmCo_5$), neodymium-boron (Fe—Nd—B) alloys, and the like.

The diamagnetic mass 106 levitates in the magnetic field when there is a balance between the magnetic field and the gravitational field of the earth. More particularly, in order for the diamagnetic mass 106 to levitate, the magnetic field B(z) satisfies the standard condition, $$Mg = V \frac{|X|}{\mu_0} \frac{\partial (B^2)}{\partial z}, \quad \text{Equation (1)}$$

where B is the field produced by the permanent magnets and the gradient of $B^2$ is understood to be averaged over the levitating mass, M is the mass of the diamagnetic mass, g is the acceleration due to gravity, V is the volume of the diamagnetic mass, and X is the diamagnetic susceptibility of the diamagnetic mass 106.

The diamagnetic mass 106 may be formed of any material having relatively large magnetic susceptibility, for instance, graphite, bismuth and the like. By way of example, the magnetic susceptibility X of graphite and bismuth is $X \approx -17 \times 10^{-5}$. Because of the relatively large magnetic susceptibility of the diamagnetic mass 106, the diamagnetic mass 106 may have a relatively large mass, for instance, of the order of a few grams, where the flux density of the magnetic fields is of the order of 1 Tesla to 3 Tesla, which is readily achievable with the permanent magnets 104. In one regard, the relatively large mass makes it relatively easier for the tracking apparatus 108 to track the relative displacements of the diamagnetic mass 106.

The diamagnetic mass 106 may take any of a variety of forms providing the mass of the diamagnetic mass 106 satisfies Equation (1) as described above. According to a particular embodiment, the diamagnetic mass 106 has a width in the range of about 5 millimeters to about 10 millimeters in the linear direction. In addition, the diamagnetic mass 106 may be relatively larger than the permanent magnets 104. Moreover, although the diamagnetic mass 106 has been depicted as having a relatively flat, round profile, the diamagnetic mass 106 may have other profiles, such as, a square, a spherical, a hexagonal, etc., or an irregular profile.

A plurality of tracking apparatuses 108 are further depicted in FIGS. 1A-1C and 2. The tracking apparatuses 108 are generally configured to track the position of the diamagnetic mass 106 by, for instance, optically tracking the location of the diamagnetic mass 106. In this regard, the tracking apparatuses 108 may be relatively fixed with respect to the curved base 102, such that, the tracking apparatuses 108 become perturbed when the curved base 102 becomes perturbed. The tracking apparatuses 108 may be arranged with respect to the curved base 102 in any reasonably suitable configuration with respect to each other. By way of particular example, the tracking apparatuses 108 may be spaced 120 degrees apart from each other. In addition, the tracking apparatuses 108 may be arranged in the same horizontal, vertical, or diagonal plane with respect to each other.

The diamagnetic mass 106 may be equipped with one or more markers 112 to facilitate detection of the diamagnetic mass 106 by the tracking apparatuses 108 Although not shown, the tracking apparatuses 108 may be connected to a controller configured to interpret data pertaining to the location of the diamagnetic mass 106 detected by the tracking apparatuses 108. The controller may interpret the location data to identify the location of the diamagnetic mass 106 at any given time through use of, for instance, triangulation, position tracking or any suitable process of measuring the position of the diamagnetic mass 106.

With particular reference again to FIG. 2, in instances where the curved base 102 comprises a spherical configuration, the tracking apparatuses 108 may be configured to obtain images of the interior of the spherical configuration. According to an example, the curved base 102 may be provided with openings 202 through which the tracking apparatuses 108 are configured to obtain images of the diamagnetic mass 106.

The position information of the diamagnetic mass 106 may be employed to determine whether the curved base 102 has been perturbed or otherwise moved. More particularly, for instance, the acceleration of the inertial sensing system 100 may be determined by identifying a change in the relative position of the diamagnetic mass 106 with respect to the curved base 102.

According to a particular embodiment, the inertial sensing system 100 operates as an accelerometer and is thus able to measure acceleration in two or more dimensions. Where the inertial sensing system 100 is implemented as an accelerometer, the tracking apparatus 108 measures the position of the diamagnetic mass 106 within the inertial sensing system 100.

As discussed above, the use of the permanent magnets 104 and the diamagnetic mass 106 generally minimizes or eliminates frictional forces on the diamagnetic mass 106 that may hinder its movement with respect to the curved base 102 and thus reduce the sensitivity of the inertial sensing system 100. To further reduce the frictional forces on the diamagnetic mass 106 and thereby increase the sensitivity of the inertial sensing system 100, the space in which the diamagnetic mass 106 may be a vacuum.

Figure 3A:
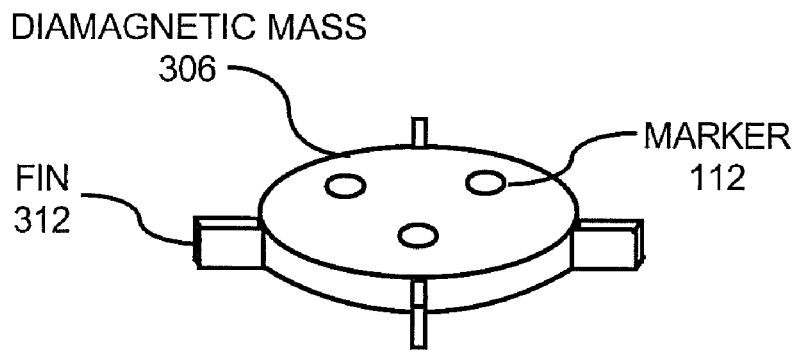
FIG. 3A illustrates an enlarged perspective view of a diamagnetic mass, according to another embodiment of the invention.

With reference now to FIG. 3A, there is shown an enlarged perspective view of a diamagnetic mass 306, according to an embodiment. It should be understood that the diamagnetic mass 306 depicted in FIG. 3A may include additional components and that some of the components described herein may be removed and/or modified without departing from a scope of the diamagnetic mass 306.

As depicted in FIG. 3A, the diamagnetic mass 306 includes a plurality of fins 312 and a plurality of markers 112. The diamagnetic mass 306 may be similar to the diamagnetic mass 106 depicted in FIG. 1A, with the addition of the fins 312. As such, the diamagnetic mass 306 may have other profiles, such as, a square profile, a spherical profile, a hexagonal profile, etc., or an irregular profile. As discussed in greater detail herein below with respect to FIG. 3B, the fins 312 generally enable an external force applied on the diamagnetic mass 306 to cause the diamagnetic mass 306 to rotate.

Figure 3B:
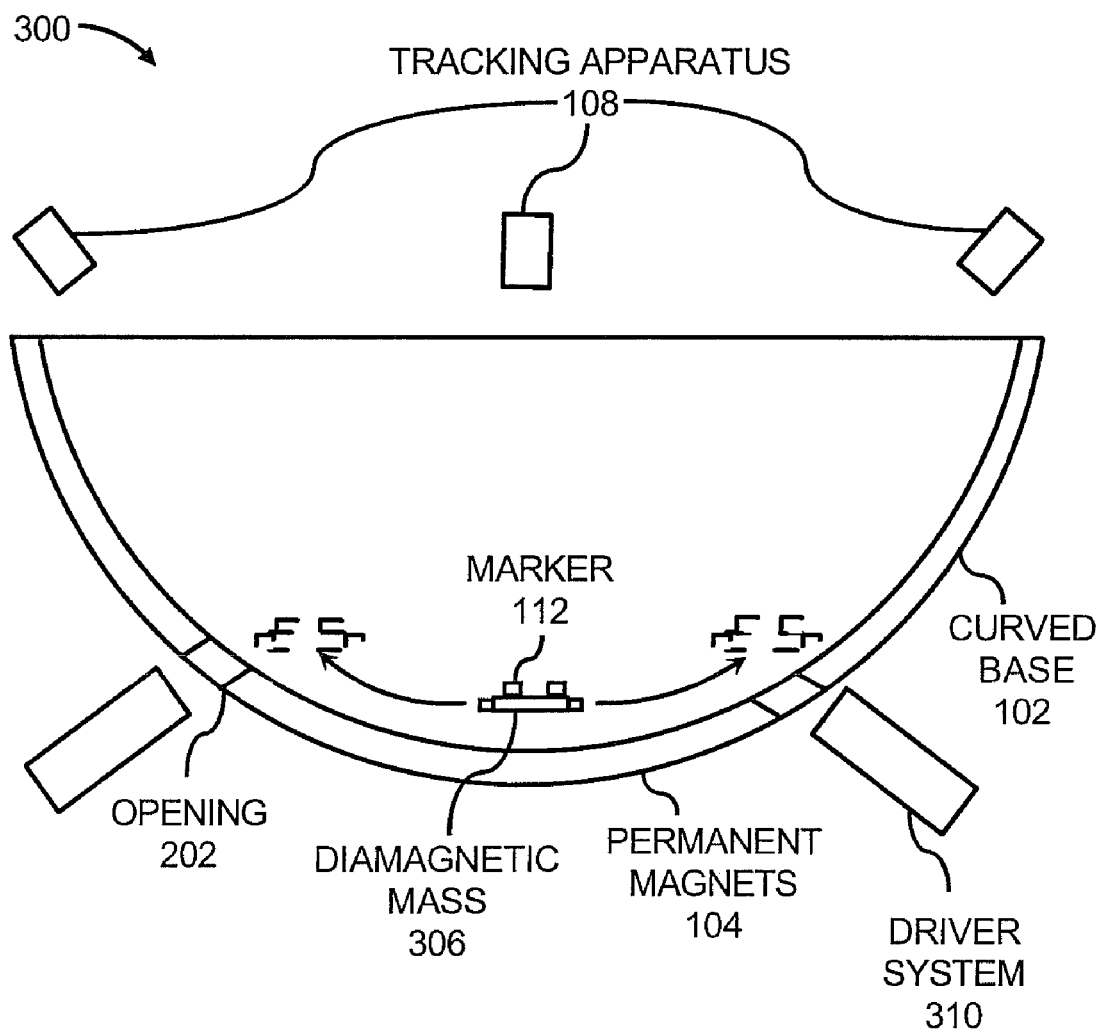
FIG. 3B illustrates a cross-sectional side view of an inertial sensing system that implements the diamagnetic mass depicted in FIG. 3A, according to an embodiment of the invention.

With particular reference now to FIG. 3B, there is shown a cross-sectional view of an inertial sensing system 300, according to an embodiment. It should be understood that the inertial sensing system 300 depicted in FIG. 3B may include additional components and that some of the components described herein may be removed and/or modified without departing from a scope of the inertial sensing system 300.

The inertial sensing system 300 depicted in FIG. 3B is similar to the inertial sensing system 100 depicted in FIGS. 1A-1C and 2. As such, the curved base 102 may have any of the configurations depicted in FIGS. 1A-1C and 2. As depicted in FIG. 3B, the inertial sensing system 300 also includes the tracking apparatus 108 discussed above and the diamagnetic mass 306 depicted in FIG. 3A. The inertial sensing system 300 also includes a driver system 310 configured to initiate or cause the diamagnetic mass 306 to rotate. In this regard, the driver system 310 may be, for instance, one of a pneumatic driver system whereby the diamagnetic mass 306 is spun with air flow and an electromagnetic driver system whereby the diamagnetic mass 306 is spun through application of an electromagnetic force. The curved base 102 may be provided with one or more openings 202 to enable the driver system 310 to apply a force on the diamagnetic mass 306 to rotate.

According to an example, the driver system 310 is configured to apply a sufficient level of force on the fins 312 of the diamagnetic mass 306 to cause the diamagnetic mass 306 to rotate at a relatively fast rate. One result of this relatively fast rotation is that the diamagnetic mass 306 resists changes in its orientation and is thus more likely to maintain its orientation when the diamagnetic mass 306 is displaced relative to the curved base 102, as graphically depicted by the dashed line versions of the diamagnetic mass 306.

In addition to tracking the relative displacement of the diamagnetic mass 306 with respect to the curved base 102, the tracking apparatuses 108 may register the angle of rotational motion of the diamagnetic mass 306. As discussed above, the marker(s) 112 enable the tracking apparatuses 308 more readily track the position and/or the angular orientation of the diamagnetic mass 306.

According to an embodiment, the inertial sensing system 300 is implemented as a gyroscope with the diamagnetic mass 306 rotated at a rate of around $10^3$ Hz to $10^4$ Hz. In this embodiment, the optical readout of the diamagnetic mass 306 is in the range of about $10^{-10}$ rad to $10^{-11}$ rad. With a precision fabrication of the diamagnetic mass 306 in the range of about 0.1 μm to 0.3 μm, the inertial sensing system 300 may have estimated precision comparable to the most precise and conventionally available quantum gyroscopic systems.

The inertial sensing systems 100 and 300 disclosed herein may be implemented in applications requiring precision, for instance, detection of gravitational fields, navigational systems, and microphones with sensitivity of the order of a fraction of a hertz. In addition, the inertial sensing systems 100 and 300 may be implemented as accelerometers in applications such as, for instance, mobile phones, and controls for game systems.

Turning now to FIG. 4, there is shown a flow diagram of a method 400 of implementing the inertial sensing system 100 depicted in FIGS. 1A-1C and 2 and the inertial sensing system 300 depicted in FIG. 3B, according to an embodiment. It should be understood that the method 400 depicted in FIG. 4 may include additional steps and that some of the steps described herein may be removed and/or modified without departing from a scope of the method 400.

At step 402, the diamagnetic mass 106, 306 is positioned within the curved base 102. At step 404, the position of the diamagnetic mass 106, 306 with respect to the curved base 102 is monitored. More particularly, the tracking apparatuses 108 may be implemented to monitor the position of the diamagnetic mass 106, 306 by triangulation, position tracking or any suitable process for monitoring the position of the diamagnetic mass 106, 306.

At step 406, the relative displacement of the diamagnetic mass 106, 306 with respect to the curved shell 102 is determined. The relative displacement may be caused by an external force or a perturbation applied to the curved shell 102. For instance, where the inertial sensing system 100, 300 is at rest or in motion at a constant velocity, the diamagnetic mass 106 may be positioned at the location with respect to the curved shell 102 at which there is a balance between the gravitational field and the gradient of the magnetic field produced by the permanent magnets 104. When the inertial sensing system 100, 300 is perturbed or when the inertial sensing system 100, 300 otherwise undergoes an acceleration change, the change in position of the diamagnetic mass 106 with respect to the inertial sensing system 100, 300 may be used to determine the acceleration of the inertial sensing system 100, 300, which may be used to track, for instance, movement of an apparatus in which the inertial sensing system 100, 300 is located.

Turning now to FIG. 5, there is shown a flow diagram of a method 500 of using the inertial sensing system 300 depicted in FIG. 3B, according to an embodiment. It should be understood that the method 500 depicted in FIG. 5 may include additional steps and that some of the steps described herein may be removed and/or modified without departing from a scope of the method 500.

At step 502, the diamagnetic mass 306 is positioned within the curved base 302. In addition, at step 504, the diamagnetic mass 306 is caused to rotate with respect to the curved base 102. As discussed above, one or more components of the driver system 310 may operate to apply a force onto the fins 312 of the diamagnetic mass 306 to cause the diamagnetic mass 306 to rotate. As also discussed above, the diamagnetic mass 306 may be caused to rotate at a sufficient speed to cause the inertial sensing system 300 to operate as a gyroscope.

At step 506, the position and/or the orientation of the diamagnetic mass 306 within the curved base 102 are monitored. As discussed above, the tracking apparatuses 108 may operate to monitor either or both of the position and orientation of the diamagnetic mass 306. According to an embodiment, the tracking apparatuses 108 operate by spectroscopic measurement or any process suitable to measure the angle of rotational motion of the diamagnetic mass 306.

At step 508, either or both of the relative displacement and the orientation of the diamagnetic mass 306 with respect to the curved shell 102 is determined. The change in relative displacement and/or orientation of the diamagnetic mass 306 with respect to the curved shell 102 may be caused by an external force or a perturbation applied to the curved shell 102. For instance, where the inertial sensing system 300 is at rest or in motion at a constant velocity, the diamagnetic mass 306 may be positioned at the location with respect to the curved shell 102 at which there is a balance between the gravitational field and the magnetic field produced by the permanent magnets 104. When the inertial sensing system 300 is perturbed or when the inertial sensing system 300 otherwise undergoes an acceleration change, the change in position/orientation of the diamagnetic mass 106 with respect to the inertial sensing system 300 may be used to determine the acceleration of the inertial sensing system 300, which may be used to track, for instance, movement of an apparatus in which the inertial sensing system is located.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. An inertial sensing system comprising:
    a diamagnetic mass;
    a plurality of permanent magnets positioned to form a curved base, wherein the plurality of permanent magnets are configured to provide an inhomogeneous magnetic field upon which the diamagnetic mass becomes levitated above the plurality of permanent magnets within the curved base and wherein the curved base also provides a confinement potential to substantially prevent the diamagnetic mass from exiting an interior of the curved base; and
    a tracking apparatus for monitoring at least one of a position and an orientation of the diamagnetic mass with respect to the curved structure.

2. The inertial sensing system according to claim 1, wherein the diamagnetic mass comprises a material from the group consisting of graphite and bismuth.

3. The inertial sensing system according to claim 1, wherein the diamagnetic mass contains at least one marker configured to be readily identified by the tracking apparatus.

4. The inertial sensing system according to claim 1, wherein the diamagnetic mass contains a plurality of fins configured to be repelled through application of a force and cause the diamagnetic mass to rotate.

5. The inertial sensing system according to claim 1, further comprising a driver system configured to apply a force onto the diamagnetic mass to cause the diamagnetic mass to rotate.

6. The inertial sensing system according to claim 5, wherein the driver system comprises at least one of a pneumatic driver system and an electromagnetic driver system.

7. The inertial sensing system according to claim 1, wherein the curved base comprises a hemispherical configuration.

8. The inertial sensing system according to claim 1, wherein the curved base comprises a spherical configuration.

9. The inertial sensing system according to claim 1, wherein the plurality of permanent magnets comprises at least one of samarium cobalt, bornite, and a neodymium-boron (Fe—Nd—B) alloy.

10. The inertial sensing system according to claim 1, further comprising:
    a curved shell, wherein the curved shell is paved with the plurality of permanent magnets to form the curved base.

11. An earth gravitation field detector comprising the inertial sensing system according to claim 1.

12. A navigational device comprising the inertial sensing system according to claim 1.

13. A microphone comprising the inertial sensing system according to claim 1.

14. A method of implementing an inertial sensing system, said method comprising:
    positioning a diamagnetic mass within a curved base formed of a plurality of permanent magnets, wherein the plurality of permanent magnets are configured to provide an inhomogeneous magnetic field upon which the diamagnetic mass becomes levitated above the plurality of permanent magnets within the curved base and wherein the curved base also provides a confinement potential to substantially prevent the diamagnetic mass from exiting an interior of the curved base;
    monitoring the position of the diamagnetic mass using a tracking apparatus; and
    determining a relative displacement of the diamagnetic mass with respect to the curved base based upon the monitored positioned of the diamagnetic mass.

15. A method of implementing an inertial sensing system, said method comprising:
    positioning a diamagnetic mass within a curved base formed of a plurality of permanent magnets, wherein the plurality of permanent magnets are configured to provide an inhomogeneous magnetic field upon which the diamagnetic mass becomes levitated above the plurality of permanent magnets within the curved base and wherein the curved base also provides a confinement potential to substantially prevent the diamagnetic mass from exiting an interior of the curved base;
    causing the diamagnetic mass to rotate;
    monitoring the position and orientation of the diamagnetic mass using a tracking apparatus; and
    determining at least one of a relative displacement and a change in orientation of the diamagnetic mass with respect to the curved based upon at least one of the monitored position and orientation of the diamagnetic mass.

16. The method according to claim 15, wherein causing the diamagnetic mass to rotate further comprises causing the diamagnetic mass to rotate through application of air flow onto the diamagnetic mass.

17. The method according to claim 15, wherein causing the diamagnetic mass to rotate further comprises causing the diamagnetic mass to rotate through application of an electromagnetic force onto the diamagnetic mass.

* * * * *